Feb. 19, 1957 J. R. MILNE 2,781,549
METHOD OF MOLDING ARTICLES HAVING SPACED
DISCONTINUITIES THEREIN
Filed April 19, 1952 4 Sheets-Sheet 1

JOHN R. MILNE
INVENTOR.

Feb. 19, 1957 J. R. MILNE 2,781,549
METHOD OF MOLDING ARTICLES HAVING SPACED
DISCONTINUITIES THEREIN
Filed April 19, 1952 4 Sheets-Sheet 2

JOHN R. MILNE
*INVENTOR*

Feb. 19, 1957 J. R. MILNE 2,781,549
METHOD OF MOLDING ARTICLES HAVING SPACED
DISCONTINUITIES THEREIN
Filed April 19, 1952 4 Sheets-Sheet 3
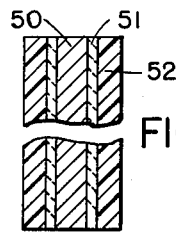
FIG. 14.
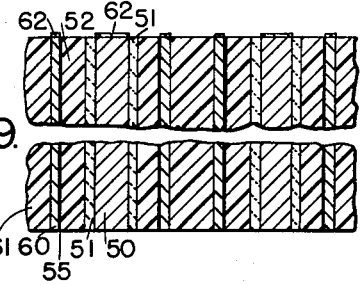
FIG. 19.
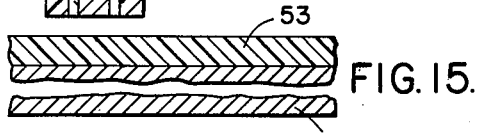
FIG. 15.
FIG. 20.
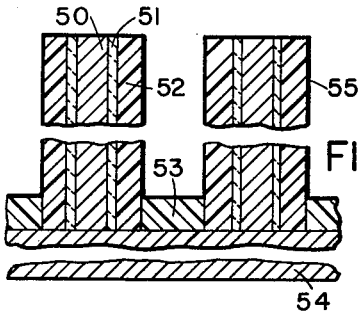
FIG. 16.
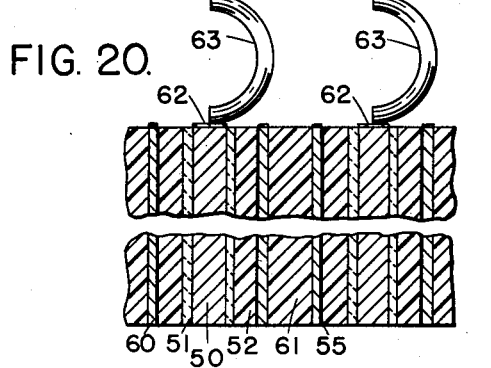
FIG. 21.
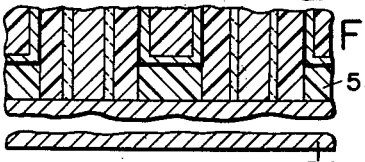
FIG. 17.
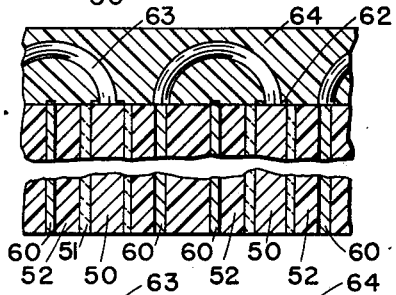
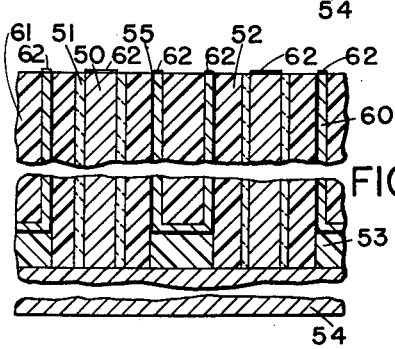
FIG. 18.
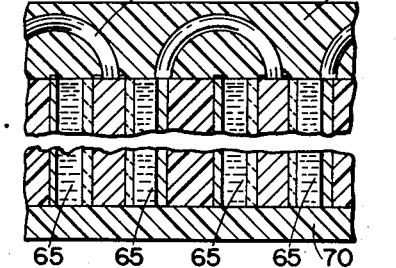
FIG. 22.
JOHN R. MILNE
*INVENTOR.*

Feb. 19, 1957 J. R. MILNE 2,781,549
METHOD OF MOLDING ARTICLES HAVING SPACED
DISCONTINUITIES THEREIN
Filed April 19, 1952 4 Sheets-Sheet 4

JOHN R. MILNE
*INVENTOR.*

United States Patent Office 2,781,549
Patented Feb. 19, 1957

2,781,549

METHOD OF MOLDING ARTICLES HAVING SPACED DISCONTINUITIES THEREIN

John R. Milne, Dallas, Tex.

Application April 19, 1952, Serial No. 283,259

20 Claims. (Cl. 18—47.5)

This invention relates to a method of molding an article containing controlled or uniformly spaced discontinuities.

For many purposes, an article having controlled or uniformly spaced discontinuities, particularly minute although uniformly dimensioned and controlled oriented discontinuities, is highly desirable. For example, in the fractionation of polymers by diffusion through a membrane, it is highly desirable that the membrane contain a large number of minute, uniformly dimensioned, uniformly spaced and controlled oriented foramina in order to obtain effective fractionation. Also, in a photoelectric mosaic, it is highly desirable that the discrete, photosensitive centers be uniformly dispersed upon or within the supporting medium in the form of a large number of small, unitary bodies of uniform shape, dimension, and controlled orientation. However, using ordinary methods of manufacture, the production of each article becomes increasingly difficult as the number of discontinuities increase, as the shape of the discontinuities becomes complex, and as the orientation and spacing of the discontinuities are required to be more uniform.

It is an object of this invention to produce a molded article. It is another object of this invention to produce a pattern for making a molded article. It is another object of this invention to produce a molded article having a large number of discontinuities that are controlled or uniform with respect to spacing, dimensions, and orientation. It is another object of this invention to produce a foraminous sheet whose pores are of predesigned size, shape, and spacing and which are completely disconnected from one another. It is another object of this invention to produce a photoelectric mosaic. It is another object of this invention to produce a dry cell battery. It is another object of this invention to produce an oilless bearing. These and further objects of the invention will become apparent from the following description thereof.

In accordance with the invention, I produce a molded article by electromagnetically orienting particles of a first material on a suitable surface of a second material to provide a matrix and molding a third material within the interstices formed by the particles of the first material projecting from the surface of the second material. Either the first material or the second material or both the first material and the second material may or may not be thereafter removed from the third material depending upon the particular molded article desired.

Figures 6 to 13, inclusive, are views partly in elevation and partly in section illustrating an embodiment of the invention.

Figures 14 to 22, inclusive, are views partly in elevation and partly in section illustrating another embodiment of the invention.

Figure 23:
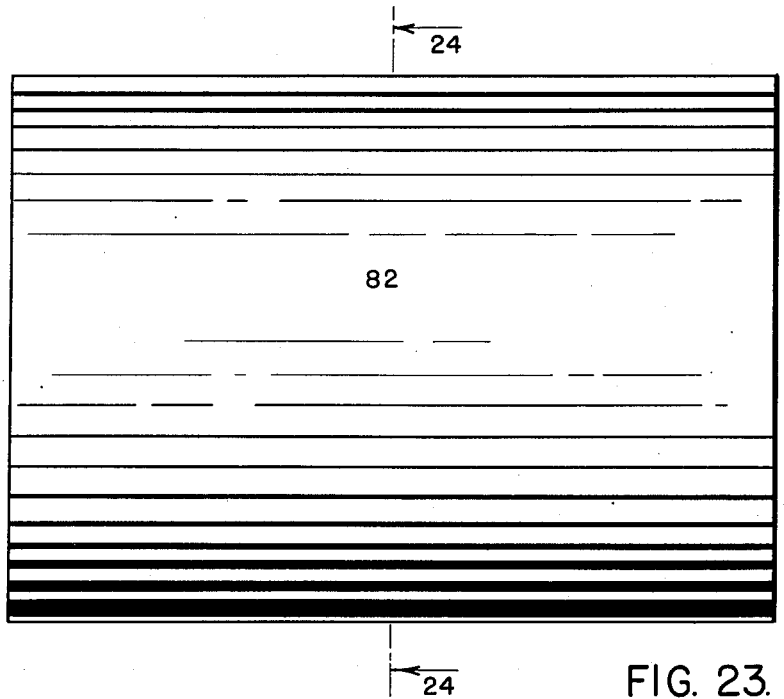

Figure 23 is a view in elevation illustrating still another embodiment of the invention.

Figure 24:
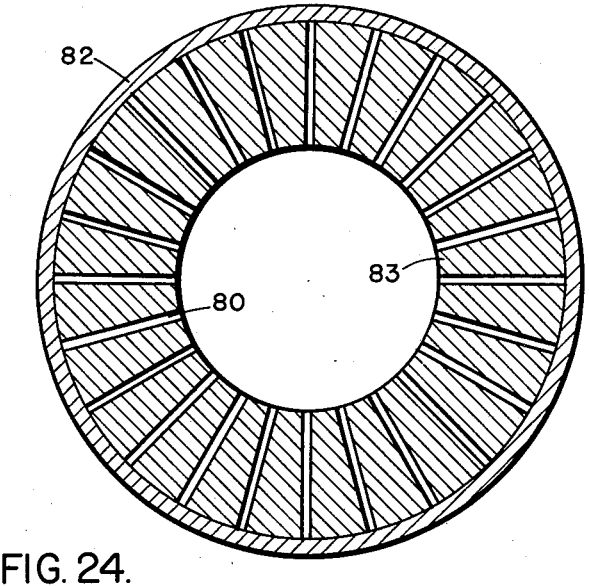

Figure 24 is a view in section taken along the line 24—24 of Figure 23.

The particles of the first material may be of any desired size. Because of the fact that they are electromagnetically oriented on the surface of the second material, they are uniformly dispersed and uniformly oriented irrespective of minuteness and thus an extremely large number of particles may be uniformly spaced and uniformly oriented within a small area on the surface of the second material. For example with particles of the first material .0001 inch in diameter, 250,000 such particles may be uniformly dispersed and uniformly oriented on a square inch of surface of the second material. However, there is no upper limit or lower limit to the size of the particles that may be employed. Further, the particles of the first material may be of any desired shape, such as parallelopipeds, cylinders, helices, etc.

The first material may be any desired material or any required material. Generally, the first material is a solid and by a solid I mean a material which will not perceptibly flow during the process of making the molded article. This material may be a metal, such as iron, glass, a plastic or resin, such as polyethylene, or any other material suited for the purpose for which it is to be employed in the molded article. Where the particles of the first material are to be removed from the molded article, they must be of a material permitting removal by the means employed, such as solution, melting, or other means, without detrimentally affecting the third material.

The particles of the first material are electromagnetically oriented on the surface of the second material. By electromagnetic orientation, I mean orientation produced in any manner by electricity, magnetism, or a combination of both producing an electromagnetic field. Thus, an electric field, a magnetic field, or a combination of an electric field and a magnetic field may be employed. By employing an electromagnetic field, the uniformity of spacing of the particles of the first material is limited only by the uniformity of the electromagnetic field. Further, since the particles of the first material will tend to orient themselves in the direction of the electromagnetic field, the particles may be oriented at any angle with respect to the surface of the second material by suitably positioning the surface of the second material with respect to the direction of the electromagnetic field. Mechanical agitation, by reason of overcoming friction between the particles and the surface, may be employed to assist in orienting the particles of the first material on the second material.

The second material, upon the surface of which the particles of the first material are to be oriented, may be any suitable material or combination of materials that will retain the particles of the first material after orientation by the electromagnetic field. This retention may be by gravity, by adherence thereto, by penetration therein of the particles for a portion of their length, or otherwise. The second material will depend upon the type of molded article desired and is generally a solid material as defined hereinabove in connection with the first material.

Where the second material is to be removed subsequently from the molded article, this material should be one that is readily removable without detrimentally affecting the other material or materials constituting the molded article. A heat sensitive resin such as polystyrene has been found satisfactory for many molded articles, heat being applied to the resin during orientation of the particles of the first material to soften the resin and the resin permitted to cool so as to harden the resin and retain the particles of the first material in their oriented and spaced positions.

The third material may be any material, or combination of materials, desired or required for the molded article and the third material comprises the continuous portion, containing the discontinuities, of the molded article. This material must be such that it may be frozen, solidified, condensed, polymerized, electroplated, compressed, or otherwise be suitably molded between the interstices of the second material. The particular type of third material employed depends primarily upon the function it is to have in the molded article desired. Thus, where the molded article is to be a foraminous sheet, the third material should be one having desired mechanical strength, resistance to environment in which it is to be used, etc. For example, the third material may be a plastic such as methyl methacrylate, glass, wax, amalgams, metals such as aluminum, lead, or copper, alloys such as brass, or any other material suitable for the purposes of the screen. On the other hand, where the desired molded article is a photoelectric mosaic or an electric battery, the material should be one having high dielectric strength such as a silicone polymer. Similarly, other materials having other properties may be used.

Molding of the third material between the interstices of the second material may be effected by any means suitable to the third material and not detrimental to the first and second materials. Thus, where the third material is a heat sensitive resin and the other materials are not heat sensitive, the third material may be molded by heating to a fluid state, flowing between the interstices of the second material, and causing it to set therein. If the third material is a metal, it may be deposited by electrolysis or by vacuum evaporation of the metal between the interstices of the second material.

Referring now to the Figures 1 to 5, which are illustrative of one embodiment of the invention, namely, the making of a foraminous sheet, a surface of a second material 10 is positioned for support upon a backing sheet 11. The second material 10 may be polystyrene and the backing sheet 11 may be formed of a material such as copper. The surface of the second material and the backing sheet are placed between the poles 12 and 13 of an electromagnet and cylindrical particles of a first material 14 are placed upon the second material. The second material may be iron. With a magnetic field established between the poles 12 and 13 of the electromagnet, the particles of the first material 14 will become oriented upon the surface of the second material. Since the particles have one axis longer than any other axis, they will be oriented upon the surface of the second material with the longer axis in the direction of the magnetic field.

With the iron cylinders oriented upon the surface of the polystyrene, heat is applied to the polystyrene to soften the polystyrene and to imbed partially the iron cylinders in the polystyrene. Upon cooling, the polystyrene will harden and retain the iron cylinders in their oriented positions. The surface of the second material, the backing sheet, and the oriented particles of the first material retained in their oriented positions on the surface of the second material are removed from between the poles of the electromagnet. A third material, which may be methyl methacrylate, is molded between the interstices formed by the particles of the first material projecting from the surface of the second material to a depth, as shown, just equal to the depth of the projecting portion of the particles of the first material. Following molding of the third material, the surface of the second material 10 is stripped from the coherent body of the third material containing the imbedded particles of the first material. The imbedded particles of the first material are then removed from the coherent body of the third material as by solution in acid. The resulting product is a foraminous sheet of methyl methacrylate in which each foramen 16 is equivalent in size, shape, and position to the corresponding particle of the first material oriented upon the surface of the second material.

The invention will be described in greater detail in connection with the following specific examples.

*Example 1*

In the fractionation of high molecular weight polymers, a mixture of the polymers suitably dispersed is permitted to contact a porous membrane. A portion of the polymers, depending upon their molecular weight, diffuse through the membrane and the remainder do not diffuse through the membrane, thus effecting a separation or fractionation of the polymers according to their molecular weights. According to one theory, the difference in concentration in the mixture of the polymers between one side of the membrane and the other varies exponentially with the coefficient of diffusion of the polymer molecules, the time, and the ratio of pore area to pore length in the membrane. By having a uniform pore area to pore length in the membrane and by having short, uniform pore lengths, a more effective fractionation is obtained. A particularly satisfactory molded membrane or foraminous sheet for the fractionation of high molecular weight polymers is provided by the invention.

A molded membrane is prepared in accordance with the invention by a procedure involving as a first step orienting as a first material iron cylinders 1.2 mils in diameter and 2.4 mils in length in a vertical position upon a surface of a heat sensitive resin such as polystyrene at a density of about 250,000 cylinders per square inch of surface. The heat sensitive resin may be coated to a depth of about one mil upon a flat sheet of copper having the area desired for the membrane. The orientation of the cylinders is effected by distributing the iron cylinders upon the surface of the heat sensitive resin at the desired density while the resin is maintained at a temperature below the point that the resin becomes sufficiently soft to permit the cylinders to penetrate the surface of the resin. The surface is then positioned between suitably designed poles of a magnet and adjacent to one of the pole pieces so that the iron cylinders orient themselves in the direction of the magnetic field and are maintained in this oriented position with respect to the surface. By carrying out the orientation with a magnet having suitably designed pole pieces, a uniform magnetic field may be obtained throughout the area of the surface whereby substantially all of the iron cylinders will be oriented in the same direction. After the surface has been positioned between the pole pieces of the magnet, the surface is gently tapped or vibrated or other means of overcoming friction are employed to assist in uniformly spacing the cylinders in relation to each other. With the surface between the pole pieces of the magnet and the iron cylinders properly oriented, heat is applied to the resin to raise it to a temperature such that it becomes sufficiently soft to permit each of the iron cylinders to penetrate into the resin by force of the magnetic field. Heating may be effected by passing heated air over the surface, by bathing the surface in infrared radiation, or by positioning a heater below the surface. After the resin has softened and each of the iron cylinders has penetrated into the resin, the resin is permitted to set and the iron cylinders become fixed in the surface in their oriented, uniformly spaced positions and a matrix comprising the surface and projecting iron cylinders is obtained. The matrix may then be removed from the influence of the magnetic field.

As a second step, a third material is then molded within the interstices of the projecting cylinders and a suitable third material is methyl methacrylate. The methyl methacrylate is deposited within the interstices of the projecting cylinders to a depth just equal to the projecting length of the cylinders but not sufficiently great to cover the cylinders. The methyl methacrylate is then polymerized by heat and benzoyl peroxide. Following polymerization of the methyl methacrylate, the surface of the heat sensitive resin is mechanically stripped from the polymerized methyl methacrylate body containing the iron cylinders. By virtue of the fact that the iron cylinders are imbedded at one end in the surface of heat sensitive resin and the methyl methacrylate resin does not cover the surface of the other end, the iron cylinders project from one side of the body of methyl methacrylate resin and the end surfaces are exposed at the other side of the body of methyl methacrylate resin.

As a third step, the iron cylinders are removed from the body of the polymerized methyl methacrylate. A convenient method for removing the iron cylinders is solution by a suitable acid. For example, the body of methyl methacrylate may be immersed in a dilute solution of sulphuric acid or hydrochloric acid until the iron cylinders are dissolved.

The resulting article after removal of the iron cylinders is a methyl methacrylate screen having pores 1.2 mils in diameter and approximately 2 mils in length at a density of about 250,000 per square inch of screen, the pores being uniformly oriented and spaced.

*Example II*

This example will illustrate a similar method for producing a molded foraminous sheet.

A first material, glass, in the form of cylinders having a diameter of about 0.001 inch and a length of about 0.01 inch, is placed at a density of about 4000 cylinders per square inch upon the surface of a second material, a heat sensitive resin, the heat sensitive resin surface being coated uniformly to a depth of 0.001 inch upon a flat copper sheet. Carnauba wax is suitable as the heat sensitive resin although other materials which are readily melted may be employed. An electrostatic field is applied to the sheet coated with the resin upon which the glass cylinders are placed, the electrostatic field having a strength of approximately 10,000 volts per inch, and the sheet is gently tapped or vibrated whereby the glass cylinders are assisted to orient themselves uniformly with uniform spacing on the surface of the heat sensitive resin. While maintaining the electrostatic field, heat is applied to the heat sensitive resin whereby the resin softens permitting the glass cylinders to become partially imbedded in the resin. After the glass cylinders have become imbedded in the resin, the resin is permitted to cool whereby the glass cylinders become bound to the resin and the electrostatic field is discontinued.

The first step of forming the molded foraminous sheet having been completed, the next step of depositing the third material to fill the interstices between the glass cylinders is carried out. In this example, the third material is nickel and the matrix comprising the glass cylinders bound in the resin is coated with metallic nickel to a depth just slightly less than that of the glass cylinders. The matrix may be coated with the nickel in the manner well known in the art of electroforming. The composite sheet thus formed is removed from the copper sheet by heating slightly to warm the resin and then stripping the copper sheet from the remainder of the sheet.

As a third step in forming the foraminous sheet, the resin and the glass cylinders are removed from the nickel. The resin is removed simply by heating to a temperature sufficient to cause melting and volatilization of the resin leaving a composite sheet of nickel containing the glass cylinders as discontinuities. The composite sheet is then treated with hydrofluoric acid, as by immersing the sheet in a bath of hydrofluoric acid, which dissolves out the glass cylinders leaving a molded nickel screen approximately 0.01 inch thick and having foramina of a uniform diameter of 0.001 inch and of a density of about 4000 per square inch.

*Example III*

This example will illustrate another method of forming a foraminous sheet.

Cylinders of iron, as a first material, of desired diameter and length are fluxed and tinned with a solder. A sheet of steel, as a second material, is likewise fluxed and tinned on one surface thereof with solder. The iron cylinders are then distributed on the tinned surface of the steel sheet in a desired density and oriented in an upright position thereon by means of a magnetic field in the manner described in the previous examples. While maintaining the magnetic field, the sheet and the cylinders are heated to a temperature sufficiently high to solder the cylinders to the steel sheet. The assembly is permitted to cool and the magnetic field discontinued.

The assembly is then coated with a thin layer of wax to prevent tight adhesion of the cylinders to the third material which is subsequently molded between the interstices formed by the projecting cylinders on the sheet. Rubber as a third material is then molded to a desired depth between the interstices formed by the projecting cylinders and allowed to set therein. Following setting of the rubber, the steel sheet and the iron cylinders are removed from the molded rubber by stripping the rubber therefrom. The molded article thus formed has particular use as a corrosion resistant filter base although it may be used for other purposes.

It will be apparent that the assembly of the steel sheet and the iron cylinders constitutes a pattern and the pattern may be employed for the further production of identical molded foraminous sheets.

In place of employing a sheet of steel for orienting the cylinders thereon, a drum of suitable material may be employed. Wax is effective for preventing adhesion of the third material to the first and second materials but other materials such as a silicone varnish or a metal non-adherent to the third material and applied by electroforming may be employed. Further, plastic or other suitable material may be substituted for the rubber.

*Example IV*

Another example of a molded article which may be constructed in accordance with the invention is a photoelectric mosaic. Photoelectric mosaics are light-sensitive screens responding to variations in light intensity at different portions of the screen by changes in electric impedance of the screen at the different portions subject to the light of varying intensity. The mosaics are employed in various types of instruments, a typical example being a television camera where the photoelectric mosaic functions as the receiver of the image to be televised. The photoelectric mosaics which may be constructed in accordance with the invention may be single or double sided, including barrier-grid and conductive mosaics. The construction of a double-sided photoelectric mosaic will be described. Figures 6 to 13, inclusive, illustrate the construction of the mosaic.

Cylinders 20 of a first material, silver, 1.2 mils in diameter and 2.4 mils long are coated over their entire surfaces with a highly dielectric material 21, such as a silicone varnish. For coating the cylinders of silver, any suitable means may be employed, such as by immersion of the cylinders in the material while in the liquid phase or in solution in a suitable medium, by spraying the cylinders with the material in the liquid phase or in solution, or by condensing the material upon the cylinders from the gaseous phase. A flat surface 22 of a metal or other suitable material is then coated to a uniform depth, for example to a depth of 0.2 mil with a heat sensitive resin 23 such as polystyrene, the second material in this example. The surface of the heat sensitive resin is then made electrically conducting by the application thereto of a thin layer 24 of an electrically conducting material such as graphite by means well known to the art of electroforming. The coated cylinders are then distributed on the electrically conducting surface of the heat sensitive resin at a density of about 250,000 cylinders per square inch and the cylinders are then oriented on the surface by application of an electrostatic field, the surface being tapped or vibrated to assist in orientation. Heat is applied to the heat sensitive resin to permit penetration of the coated silver cylinders into the heat sensitive resin and, after penetration of the cylinders, referring to Figure 8, the heat sensitive surface is permitted to cool and harden and the electrostatic field is discontinued.

Figure 1:
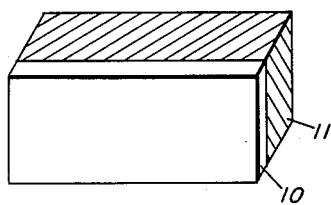
Figure 1 is an isometric view, cut away, of a surface of a second material positioned upon a backing sheet.
Figure 2:
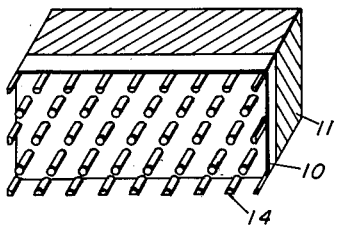
Figure 2 is an isometric view, cut away, of the surface of Figure 1 having particles of a first material oriented thereon.
Figure 5:
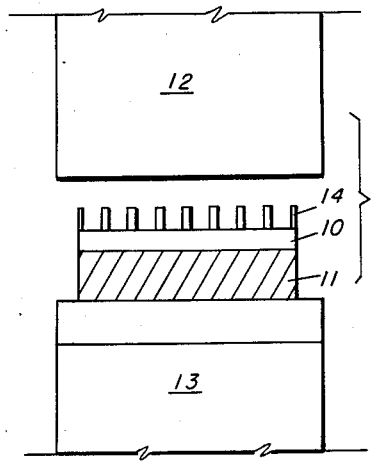
Figure 5 is a schematic diagram illustrating electro-orientation of the particles of the first material upon the surface of the second material.
Figure 3:
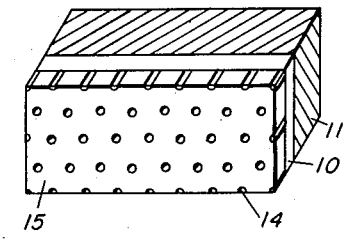
Figure 3 is an isometric view, cut away, of the surface of Figure 1 having particles of a first material oriented thereon and a third material molded within the interstices between the particles of the first material.
Figure 4:
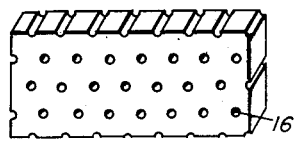
Figure 4 is an isometric view, cut away, of a coherent body of the molded third material separated from the surface of the second material and having removed therefrom the particles of the first material.
Figure 6:
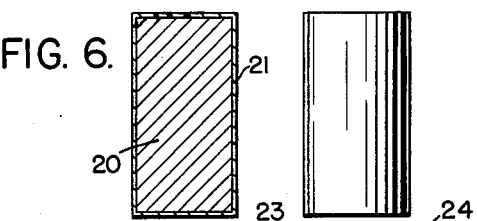
Figure 7:
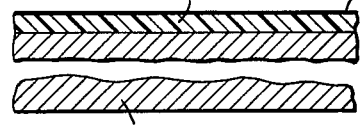
Figure 8:
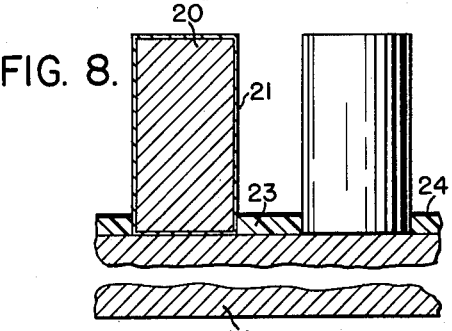
Figure 9:
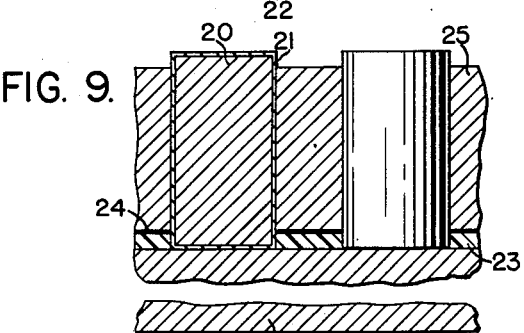
Figure 10:
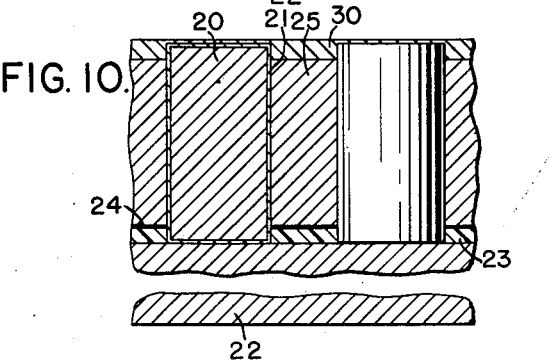
Figure 11:
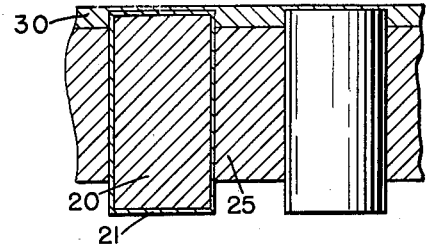
Figure 12:
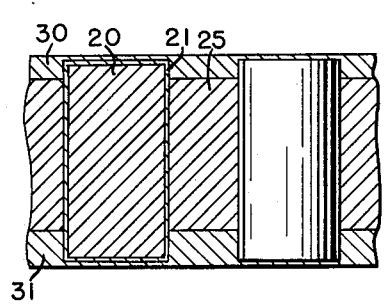
Figure 13:
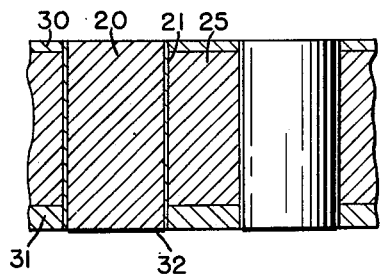

As a next step, referring to Figure 9, the third material 25 is deposited within the interstices of the projecting cylinders of the matrix thus formed. Nickel is the third material employed in construction of the mosaic and it is deposited within the interstices by electroforming. This may be accomplished by immersing the matrix in a solution of a nickel salt, and passing an electrical current between the matrix and an anode, the matrix being the cathode and being electrically conducting by virtue of the layer of graphite or other electrically conducting material previously applied. The nickel is deposited to a thickness of about 2.0 mils.

The coated silver cylinders will project from the surface of the third material, tthe nickel, to a distance of approximately 0.2 mil. The spaces between the projecting cylinders are then filled and the ends of the projecting cylinders are covered with a highly dielectric material 30, referring to Figure 10, the material preferably, although not necessarily, being the same highly dielectric material previously employed for coating, referring to Figure 11, the silver cylinders. Next, the surface coated with the heat sensitive resin, and the heat sensitive resin, are stripped from the sheet thus formed.

The sheet is immersed in an electrolytic bath and an electrical current is passed between the sheet and a suitable cathode, the exposed nickel surfaces of the sheet being the anode. Electrolysis is continued until the exposed nickel surfaces have been stripped to a depth of about 0.4 mil. The coated silver cylinders will project beyond the surfaces of the nickel for this distance of about 0.4 mil and, referring to Figure 12, the interstices between the projecting cylinders are then filled and the ends of the projecting cylinders are covered with a highly dielectric material 31, the material preferably, although not necessarily, being the same highly dielectric material previously employed for coating the silver cylinders. Both sides of the sheet are then lapped until the silver cylinders are exposed at both ends and the exposed ends 32, referring to Figure 13, of the silver cylinders at one side of the sheet only are then oxidized and thereafter cesiated.

A photoelectric mosaic constructed in accordance with the invention is particularly advantageous in having a high signal-noise ratio which is due largely to the absence of spurious signals which are caused by blemishes on the mosaic such as pin-holes, elements short-circuited to the signal screen, variation in secondary electron emission from the surface of the insulating layer, and leakage through the insulation.

*Example V*

Another example of a molded article which may be constructed in accordance with the invention is a battery of galvanic cells. Reference will be made to Figures 14 to 22, inclusive.

A first material 50, porous iron wire 4 mils in diameter, is coated to a depth of one mil with a porous ceramic material 51, such as china clay, by dipping in slip and firing at a low temperature. The ceramic coated wire is then coated to a depth of 3 mils with polystyrene 52 or other thermoplastic resin having a fairly high softening point, and following application of the second coating the wire is cut as shown into cylinders 30 mils in length.

A second material 53, referring to Figure 15, a heat sensitive resin, is applied to a suitable plane backing surface 54 of wood, metal, or other substantially rigid material to a uniform depth of about 4 mils. The coated cylinders are then distributed on the surface of the heat sensitive resin to a density of 2500 per square inch and oriented thereon with the aid of a magnetic field. Heat is applied to the heat sensitive resin whereon the cylinders penetrate into the heat sensitive resin. The resin is then allowed to cool and harden imbedding the cylinders therein and the magnetic field is discontinued. The projecting cylinders and the surface of the resin from which they project are now made electrically conducting, referring to Figure 16, by the application thereto of an electrically conducting material 55 such as graphite.

The third material 60, in this example, nickel, is then deposited within the interstices between the projecting cylinders. This may be accomplished, as described in connection with the preceding example, by immersing the sheet containing the projecting cylinders in a solution of a nickel salt and passing an electrical current between the sheet and a suitable anode, the sheet being the cathode. Electroplating is continued until the surface of the heat sensitive resin and the projecting cylinders are coated with a layer of nickel one mil thick.

The interstices, referring to Figure 17, between the projecting nickel plated cylinders are then filled with a thermosetting resin 61, a polyester resin, such as "vibrin X–1047," being suitable, care being taken that the bond between the sheet and the backing surface is not broken. The thermosetting resin surface is now lapped to form a plane surface and to expose the ends of the iron cylinders and the surrounding nickel coating. The exposed surface of both the iron cylinders 50 and the nickel coating 60 is next fluxed and tinned with a low melting point solder 62, referring to Figure 18. Thereafter, referring to Figure 19, the backing surface and the heat sensitive resin are stripped from the remainder of the sheet and the surface thus exposed is lapped sufficiently that the coating of nickel connecting the iron cylinders is completely removed to produce a surface consisting of the exposed ends of the iron cylinders 50, annular sections of ceramic material 51 around the iron cylinders, annular sections of thermoplastic resin 52 around the ceramic material, annular sections of nickel 60 around the thermoplastic resin, and the thermosetting resin 61 separating the annular sections of nickel from each other.

Iron wire 63 two mils in diameter is bent and cut into segments having the shape and size of a half circle, the circle having a diameter of fifteen mils. These semi-circular segments are fluxed and tinned with a low melting point solder and then oriented upon the sheet at a density of slightly more than 2500 per square inch with the aid of a magnetic field directed perpendicularly to the sheet. By orienting the semi-circular segments of iron wire upon the sheet with the aid of a magnetic field, referring to Figure 20, one end of each segment will be contacted with the exposed end of one iron cylinder and the segment will stand upon the sheet with the other end vertically above the end contacting the iron cylinder. While maintaining the magnetic field perpendicular to the sheet, an electrostatic field is applied parallel to the surface of the sheet to cause the ends of the semi-circular segments to move downwardly to contact the sheet. By virtue of maintaining the magnetic field and by virtue of the linear distance between the ends of the semi-circular segments and the spacing of the iron cylinder and their surrounding annuli of ceramic material and nickel, the semi-circular segments will remain upright upon the sheet with one end contacting an exposed end of an iron cylinder and the other end contacting a ring of nickel about an adjoining iron cylinder. The magnetic and electrostatic fields are maintained and heat is applied to the sheet to solder the ends of the semi-circular segments to the iron cylinders and circles of nickel. The magnetic and electrostatic fields may then be discontinued. The entire surface is then covered with a thermosetting resin 64, referring to Figure 21, of the same type employed for filling the interstices between the nickel coating surrounding the ceramic material about the iron cylinders. Sufficient of the thermosetting resin is employed to form a smooth, even surface.

The thermoplastic resin 52 is removed, by the use of solvent or heat or both, from the reverse side of the surface and a suspension 65, referring to Figure 22, of hydrated nickelic oxide in an aqueous solution of potassium hydroxide having a specific gravity of about 1.20 is placed in the voids formed by removal of the thermoplastic resin between the iron cylinders 50 and the nickel 60. If necessary, a vacuum may be employed to assist in placing the suspension of nickelic oxide in the voids. The voids are then sealed and the entire surface of the sheet covered with a thermosetting resin 70 of the same type employed for covering the other surface.

The sheet is then trimmed in two parallel planes bisecting rows of iron cylinders and parallel to the orientation of the semi-circular iron segments and in two parallel cylindrical surfaces passing between iron cylinders and intersecting the parallel planes. Connections are soldered to the ends of the segments in each of the cylindrical surfaces of the resulting battery. The battery thus produced provides approximately 60 volts per inch of length and approximately 60 milliamperes per inch of width.

*Example VI*

An oilless bearing is another example of a molded article which may be constructed in accordance with the invention. The finished bearing is illustrated in Figures 23 and 24.

Four thousand cylinders 80 of a first material, graphite, in cylinders having a length of one-half inch and a diameter of 1/32 inch, are distributed over the surface of a second material, polystyrene or other heat sensitive resin, coated on the inside surface of a steel tube 82 having a length of three inches, an inside diameter of two inches, and a wall thickness of 1/16 inch. The tube is disposed horizontally and is rotated at a rate of 1500 revolutions per minute. A rotationally symmetrical static electric field is produced within the tube by means of a concentric electrode to orient the graphite cylinders and a longitudinal vibratory movement is applied to the tube to assist in uniform spacing of the cylinders. While continuing the rotation of the tube, heat is applied to the tube, preferably dielectrically, to soften the polystyrene and permit the graphite cylinders to penetrate the surface thereof, and thereafter the application of heat is discontinued to cool the polystyrene and secure the graphite cylinders thereto.

Retaining walls are applied to the ends of the tube and, with the electric field removed but rotation of the cylinder continued, 0.7 pound of a third material 83, bronze powder having an average particle size of one micron, is fed into the tube by means of a feeding tube penetrating one of the retaining walls and the bronze powder distributes itself within the interstices formed by the graphite cylinders on the surface of polystyrene along the walls of the tube. The rotational speed of the tube is increased to 3000 revolutions per minute and heat is applied, preferably dielectrically, to the tube to sinter the particles of bronze powder and thereby mold the bronze within the interstices formed by the graphite cylinders. Application of heat is discontinued and rotation of the tube is continued until the tube has cooled. Thereafter, the bore of the resulting molded tube within the steel tube may be reamed to the desired diameter.

Having thus described my invention, it will be understood that such description has been given by way of illustration and example and not by way of limitation, reference for the latter purpose being had to the appended claims.

I claim:

1. The process for making a molded article comprising electro-orienting particles of a first material on a surface of a second material, molding a third material within the interstices formed by the particles of said first material oriented on the surface of said second material to fill said interstices to a depth at least partially that of said particles of said first material and form a coherent body comprising said molded third material containing said particles of said first material at least partially imbedded therein, and thereafter removing at least a portion of at least said first material from said coherent body.

2. The process for making a molded article comprising electro-orienting particles of a first material on a surface of a second material, bonding the oriented particles of said first material to said surface of said second material, molding a third material within the interstices formed by the particles of said first material projecting from the surface of said second material to fill said interstices to a depth at least partially that of said particles of said first material and form a coherent body comprising said molded third material containing said particles of said first material at least partially imbedded therein, and thereafter removing at least a portion of at least said first material from said coherent body.

3. The process for making a molded article comprising electro-orienting particles of a first material on a surface of a second material, partially imbedding the oriented particles of said first material in said surface of said second material, bonding said partially imbedded particles of said first material to said surface of said second material, molding a third material within the interstices formed by the particles of said first material projecting from the surface of said second material to fill said interstices to a depth at least partially that of said projecting particles of said first material and form a coherent body comprising said molded third material containing said particles of said first material at least partially imbedded therein, and thereafter removing at least a portion of at least said first material from said coherent body.

4. The process for making a molded article comprising electro-orienting particles of a first, solid material on a surface of a second material capable of setting from a plastic condition to a substantially non-plastic condition, partially imbedding said oriented particles of said first material in said second material while said second material is in a plastic condition, bonding said partially imbedded particles of said first material to said surface of said second material by effecting setting of said second material to a substantially non-plastic condition, molding a third material within the interstices formed by the particles of said first material projecting from the surface of said second material to fill said interstices to a depth at least partially that of said projecting particles of said first material and form a coherent body comprising said molded third material containing said particles of said first material at least partially imbedded therein, and thereafter removing at least a portion of at least said first material from said coherent body.

5. The process for making a molded article comprising electro-orienting particles of a first, solid material on a surface of a second material plastic at elevated temperatures and substantially non-plastic at lowered temperatures, partially imbedding said oriented particles of said first material in said second material while said second material is at a temperature such that said second material is plastic, bonding said partially imbedded particles of said first material to said surface of said second material by lowering the temperature of said surface of said second material, molding a third material within the interstices formed by the particles of said first material projecting from the surface of said second material to fill said interstices to a depth at least partially that of said projecting particles of said first material and form a coherent body comprising said molded third material containing said particles of said first material at least partially imbedded therein, and thereafter removing at least a portion of at least said first material from said coherent body.

6. The process for making a molded article having substantially uniformly sized, shaped, and spaced discontinuities with respect to one material comprising placing substantially uniformly sized and shaped particles of a first material on a surface of a second material, imposing on said surface an electromagnetic field whereby said particles are uniformly spaced and oriented on said surface, molding a third material within the interstices formed by the particles of said first material spaced and oriented on said surface to fill said interstices to a depth at least partially that of said particles of said first material and form a coherent body comprising said molded third material containing said particles of said first material at least partially imbedded therein, and thereafter removing at least a portion of at least said first material from said coherent body.

7. The process for making a molded article having substantially uniformly sized, shaped, and spaced discontinuities with respect to one material comprising placing substantially uniformly sized and shaped particles of a first material on a surface of a second material at a density of at least 2500 particles per square inch of said surface, imposing on said surface an electromagnetic field whereby said particles are uniformly spaced and oriented on said surface, molding a third material within the interstices formed by the particles of said first material spaced and oriented on said surface to fill said interstices to a depth at least partially that of said particles of said first material and form a coherent body comprising said molded third material containing said particles of said first material at least partially imbedded therein, and thereafter removing at least a portion of at least said first material from said coherent body.

8. The process for making a molded article having substantially uniformly sized, shaped, and spaced discontinuities with respect to one material comprising placing substantially uniformly sized and shaped particles of a first, solid material on a surface of a second material plastic at elevated temperatures and substantially non-plastic at lowered temperatures, imposing an electromagnetic field on said surface whereby said particles are uniformly spaced and oriented on said surface, heating said surface to a temperature to render said second material plastic, maintaining said electromagnetic field and permitting said spaced and oriented particles to become partially imbedded in said surface in their spaced and oriented positions, cooling said surface while still maintaining said electromagnetic field whereby said partially imbedded particles become bonded to said surface in their spaced and oriented positions, molding a third material within the interstices formed by said particles projecting from said surface to fill said interstices to a depth at least partially that of said projecting particles and form a coherent body comprising said molded third material containing said particles of said first, solid material at least partially imbedded therein, and thereafter removing at least a portion of at least said first material from said coherent body.

9. The process for making a molded article having substantially uniformly sized, shaped, and spaced discontinuities with respect to one material comprising placing substantially uniformly sized and shaped particles of a first, solid material on a surface of a second material plastic at elevated temperatures and substantially non-plastic at lowered temperatures, the density of said particles being at least 2500 per square inch of said surface, imposing an electromagnetic field on said surface whereby said particles are uniformly spaced and oriented on said surface, heating said surface to a temperature to render said second material plastic, maintaining said electromagnet field and permitting said spaced and oriented particles to become partially imbedded in said surface in their spaced and oriented positions, cooling said surface while still maintaining said electromagnetic field whereby said partially imbedded particles become bonded to said surface in their spaced and oriented positions, molding a third material within the interstices formed by said particles projecting from said surface to fill said interstices to a depth at least partially that of said projecting particles and form a coherent body comprising said molded third material containing said particles of said first material at least partially imbedded therein, and thereafter removing at least a portion of at least said first material from said coherent body.

10. A process for making a molded plastic membrane having substantially uniformly sized, shaped, and spaced foramina comprising placing substantially uniformly sized and shaped metal particles on a surface of a heat sensitive resin, imposing on said surface an electromagnetic field whereby said metal particles are uniformly spaced and oriented on said surface, heating said surface to a temperature to render said heat sensitive resin plastic, maintaining said electromagnetic field and permitting said spaced and oriented metal particles to become partially imbedded in said heat sensitive resin in their spaced and oriented positions, cooling said heat sensitive resin while still maintaining said electromagnetic field whereby said partially imbedded particles become bonded to said heat sensitive resin in their spaced and oriented positions, depositing plastic material polymerizable to a solid state within the interstices formed by said metal particles projecting from said surface to fill said interstices to a depth not greater than said projecting metal particles, polymerizing said plastic material to form a coherent body comprising said polymerized plastic material containing said metal particles at least partially imbedded therein, stripping said heat sensitive resin from said coherent body of polymerized plastic material, and thereafter dissolving said metal particles from said coherent body of polymerized plastic material.

11. A process for making a molded metal membrane having substantially uniformly sized, shaped, and spaced foramina comprising placing substantially uniformly sized and shaped glass particles on a surface of a heat sensitive resin, imposing on said surface an electromagnetic field whereby said glass particles are uniformly spaced and oriented on said surface, heating said surface to a temperature to render said heat sensitive resin plastic, maintaining said electromagnetic field and permitting said spaced and oriented glass particles to become partially imbedded in said heat sensitive resin in their spaced and oriented positions, cooling said heat sensitive resin while still maintaining said electromagnetic field whereby said partially imbedded particles become bonded to said heat sensitive resin in their spaced and oriented positions, depositing a metal within the interstices formed by said glass particles projecting from said surface to fill said interstices to a depth not greater than said projecting glass particles and form a coherent body comprising said metal containing said glass particles at least partially imbedded therein, removing said heat sensitive resin from said coherent body of said metal, and thereafter dissolving said glass particles from said coherent body of metal.

12. A process for making a molded plastic membrane having substantially uniformly sized, shaped, and spaced foramina comprising placing substantially uniformly sized and shaped metal particles on a surface of a heat sensitive resin at a density of at least 2500 particles per square inch of said surface, imposing on said surface an electromagnetic field whereby said metal particles are uniformly spaced and oriented on said surface, heating said surface to a temperature to render said heat sensitive resin plastic, maintaining said electromagnetic field and permitting said spaced and oriented metal particles to become partially imbedded in said heat sensitive resin in their spaced and oriented positions, cooling said heat sensitive resin while still maintaining said electromagnetic field whereby said partially embedded particles become bonded to said heat sensitive resin in their spaced and oriented positions, depositing plastic material polymerizable to a solid state within the interstices formed by said metal particles projecting from said surface to fill said interstices to a depth not greater than said projecting metal particles, polymerizing said plastic material to form a coherent body comprising said polymerized plastic material containing said metal particles at least partially imbedded therein, stripping said heat sensitive resin from said coherent body of polymerized plastic material, and thereafter dissolving said metal particles from said coherent body of polymerized plastic material.

13. A process for making a molded rubber membrane having substantially uniformly sized, shaped, and spaced foramina comprising placing substantially uniformly sized and shaped iron particles fluxed and tinned with a solder on a fluxed and tinned metal surface, imposing on said surface an electromagnetic field whereby said iron particles are uniformly spaced and oriented on said metal surface, heating said metal surface to a temperature to soften said solder, cooling said metal surface and said iron particles while still maintaining said electromagnetic field whereby said iron particles become bonded to said metal surface in their spaced and oriented positions, covering said metal surface and said iron particles with a layer of wax, depositing rubber within the interstices formed by said iron particles projecting from said metal surface to fill said interstices to a depth not greater than said projecting iron particles and form a coherent body comprising said rubber containing said iron particles at least partially imbedded therein, allowing said coherent body of rubber to set, and thereafter removing said metal surface and said iron particles bonded thereto from said coherent body of rubber.

14. A process for making a photoelectric mosaic having substantially uniformly sized, shaped, and spaced photosensitive centers comprising placing substantially uniformly sized and shaped silver particles coated with a dielectric material on a surface of a heat sensitive resin having a thickness less than the length of said silver particles but greater than the thickness of the coating of said dielectric material and imposing an electromagnetic field on said surface whereby said silver particles are uniformly spaced and oriented on said surface, heating said surface to a temperature to render said heat sensitive resin plastic, maintaining said electromagnetic field and permitting said spaced and oriented silver particles to become imbedded in said heat sensitive resin in their spaced and oriented positions, cooling said heat sensitive resin while still maintaining said electromagnetic field whereby said imbedded silver particles become bonded in said heat sensitive resin in their spaced and oriented positions, depositing a metal within the interstices formed by said silver particles projecting from said surface to fill said interstices to a depth partially that of said projecting silver particles and form a coherent body comprise said metal containing said silver particles at least partially imbedded therein and contacting said heat sensitive resin, coating said projecting silver particles with said metal over said dielectric material, depositing a dielectric material within the interstices formed by the remaining portion of said silver particles projecting from said surface of heat sensitive resin to fill up said interstices and cover said particles with a coherent body of said dielectric material, removing said heat sensitive resin to expose said body of metal at the surface thereof contacting said heat sensitive resin and to expose the ends of said coated silver particles, subjecting said exposed body of metal to electrolysis to remove a portion thereof, depositing a dielectric material within the interstices formed by said coated silver particles projecting from said body of metal to form a coherent body of said dielectric material within said interstices, lapping said structure to remove a portion of both said bodies of dielectric material and expose said silver particles at both ends thereof, and oxidizing and cesiating said exposed silver particles at one end thereof.

15. A process for making a battery of uniformly sized, shaped, and spaced galvanic cells comprising placing substantially uniformly sized and shaped porous iron cylinders, said iron cylinders being coated on their longitudinal surfaces with a first inner coat of porous ceramic and with a second outer coat of thermoplastic resin, on a surface of a heat sensitive resin, said heat sensitive resin having a lower softening temperature than said thermoplastic resin coating said iron cylinders and having a thickness less than the length of said iron cylinders, imposing an electromagnetic field on said surface whereby said coated iron cylinders are uniformly spaced and oriented on said surface, heating said surface to render said heat sensitive resin plastic, maintaining said electromagnetic field and permitting said spaced and oriented coated iron cylinders to become imbedded in and project from said heat sensitive resin in their spaced and oriented positions, cooling said heat sensitive resin while still maintaining said electromagnetic field whereby said imbedded coated iron cylinders become bonded in said heat sensitive resin in their spaced and oriented positions, covering at least the longitudinal surfaces of said coated iron cylinders projecting from said surface of heat sensitive resin with nickel, depositing thermosetting resin within the interstices formed by said nickel-covered coated iron cylinders projecting from said surface of heat sensitive resin to fill up said interstices and cover said nickel-covered coated iron cylinders with a coherent body of said thermosetting resin, removing sufficient material from the top exterior surface of the resulting assembly to expose the ends of said coated iron cylinders and the ceramic, thermoplastic resin, and nickel coatings surrounding said iron cylinders, tinning the exposed ends of said iron cylinders and the surrounding nickel coating with solder, removing said assembly of coated iron cylinders and the body of thermosetting resin from said heat sensitive resin, removing sufficient material from the bottom exterior surface of said assembly to expose the ends of said coated iron cylinders and the ceramic, thermoplastic resin, and nickel coatings surrounding said iron cylinders and to remove any nickel connecting said exposed coated iron cylinders, placing segments of iron wire, each segment having a diameter less than said iron cylinders and having an overall length greater than the minimum distance between any one iron cylinder and the outside of the nickel coating surrounding the next nearest iron cylinder but less than the maximum distance from the inside of the nickel coating surrounding any one iron cylinder to the outside edge of the next nearest iron cylinder and being shaped in a form approximating a semicircle, each segment being fluxed and tinned, upon the surface of said assembly containing said exposed and tinned ends of said coated iron cylinders in a density slightly greater than the density of said coated iron cylinders, imposing a magnetic field on said surface perpendicular thereto whereby said semicircular segments will contact at one end thereof said exposed iron cylinders, imposing an electric field on said surface parallel thereto whereby each semicircular segment at the other end thereof will contact the nickel coating surrounding the next nearest iron cylinder, heating said segments to a temperature to soften said solder, maintaining said magnetic and electric fields while cooling said segments whereby said segments become bonded to said iron cylinders and the nickel coatings surrounding the next nearest iron cylinder, covering said surface with a thermosetting resin, removing the thermoplastic resin from the reverse side of said surface, filling the voids formed between the coated iron cylinders and said nickel by removal of said thermoplastic resin with a suspension of hydrated nickelic oxide in an aqueous solution of potassium hydroxide, covering said voids with a thermosetting resin, trimming the resulting assembly in two parallel planes bisecting rows of iron cylinders and parallel to the orientation of said semicircular segments and in two parallel cylindrical surfaces passing between iron cylinders and intersecting said parallel planes, and connecting the exposed ends of said segments with electrical conductors.

16. A process for making an oilless bearing having uniformly sized, shaped, and spaced lubricant particles therein comprising placing substantially uniformly sized and shaped graphite particles interiorly of a tubular surface of a heat sensitive resin, rotating said tubular surface at a rate sufficiently high to position said graphite particles stationary with respect to said rotating surface and imposing on said rotating surface an electromagnetic field whereby said graphite particles are uniformly spaced and oriented on said rotating surface, heating said surface to a temperature to render said heat sensitive resin plastic, maintaining said electromagnetic field and rotation of said surface and permitting said spaced and oriented graphite particles to become imbedded in said surface in their spaced and oriented positions, cooling said surface while still maintaining said electrostatic field and rotation of said surface whereby said imbedded graphite particles become bonded to said surface in their spaced and oriented positions, maintaining rotation of said surface, depositing powdered bronze within the interstices formed by said graphite particles projecting from said surface to fill said interstices to a depth at least partially that of said projecting graphite particles, heating said powdered bronze to a sintering temperature to mold said powdered bronze to a coherent body between the interstices formed by said graphite particles projecting from said surface, cooling said sintered bronze while maintaining rotation of said surface, and reaming the bore of the resulting molded tube to a desired diameter.

17. The process for making a molded article comprising electro-orienting particles of a first material on a surface of a second material, molding a third material within the interstices formed by the particles of said first material oriented on the surface of said second material to fill said interstices to a depth at least partially that of said particles of said first material and form a coherent body comprising said molded third material containing said particles of said first material at least partially imbedded therein, and thereafter removing at least a portion of said first material from said coherent body and removing said third material from said coherent body.

18. The process for making a molded article comprising electro-orienting particles of a first material on a surface of a second material, bonding the oriented particles of said first material to said surface of said second material, molding a third material within the interstices formed by the particles of said first material projecting from the surface of said second material to fill said interstices to a depth at least partially that of said particles of said first material and form a coherent body comprising said molded third material containing said particles of said first material at least partially imbedded therein, and thereafter removing at least a portion of said first material from said coherent body and removing said third material from said coherent body.

19. The process for making a molded article comprising electro-orienting particles of a first material on a surface of a second material, partially imbedding the oriented particles of said first material in said surface of said second material, bonding said partially imbedded particles of said first material to said surface of said second material, molding a third material within the interstices formed by the particles of said first material projecting from the surface of said second material to fill said interstices to a depth at least partially that of said particles of said first material and form a coherent body comprising said molded third material containing said particles of said first material at least partially imbedded therein, and thereafter removing at least a portion of said first material from said coherent body and removing said third material from said coherent body.

20. A process for making a molded membrane having substantially uniformly sized, shaped, and spaced foramina comprising placing substantially uniformly sized and shaped particles of a first material on a surface of a second material, imposing on said surface an electromagnetic field whereby said particles of said first material are uniformly spaced and oriented on said surface of said second material, bonding the oriented particles of said first material to said surface of said second material, molding a third material within the interstices formed by the particles of said first material projecting from the surface of said second material to fill said interstices to a depth not greater than that of said particles of said first material and form a coherent body comprising said molded third material containing said particles of said first material at least partially imbedded therein, and removing said particles of said first material and said third material from said coherent body.

References Cited in the file of this patent

UNITED STATES PATENTS

| | | |
|---|---|---|
| 1,949,840 | Languepin | Mar. 6, 1934 |
| 2,294,966 | Dreyfus | Sept. 8, 1942 |
| 2,376,342 | Carlton | May 22, 1945 |
| 2,548,872 | Cross et al. | Apr. 17, 1951 |